US011035570B2

(12) United States Patent
Loerch

(10) Patent No.: US 11,035,570 B2
(45) Date of Patent: Jun. 15, 2021

(54) METHOD FOR REMOVING LARGE AMOUNTS OF CONDENSATE FROM AN UNDERGROUND VAULT STEAM SYSTEM DURING STARTUP

(71) Applicant: Airgas, Inc., Radnor, PA (US)

(72) Inventor: Darcy Loerch, Seabrook, TX (US)

(73) Assignee: Airgas, Inc., Radnor, PA (US)

(*) Notice: Subject to any disclaimer, the term of this patent is extended or adjusted under 35 U.S.C. 154(b) by 168 days.

(21) Appl. No.: 16/102,857

(22) Filed: Aug. 14, 2018

(65) Prior Publication Data
US 2020/0056779 A1 Feb. 20, 2020

(51) Int. Cl.
| F16T 1/00 | (2006.01) |
| F28B 9/08 | (2006.01) |
| F22B 37/50 | (2006.01) |
| F22B 37/16 | (2006.01) |
| F22B 37/10 | (2006.01) |

(52) U.S. Cl.
CPC ........... *F22B 37/50* (2013.01); *F22B 37/107* (2013.01); *F22B 37/16* (2013.01)

(58) Field of Classification Search
CPC ........ F22B 37/10; F22B 37/16; F22B 37/104; F28G 1/04; F16T 1/00; F28F 17/005; F28B 9/08
See application file for complete search history.

(56) References Cited

U.S. PATENT DOCUMENTS

| 2,024,579 A * | 12/1935 | Johnson | F16L 41/082 137/171 |
| 3,975,912 A * | 8/1976 | Greene | F03G 7/04 60/641.2 |
| 4,171,209 A * | 10/1979 | Brown | B01D 46/10 138/41 |
| 4,426,213 A * | 1/1984 | Stavropoulos | F16T 1/34 138/41 |
| 4,592,381 A * | 6/1986 | Troy | F16T 1/34 137/203 |
| 4,731,164 A * | 3/1988 | Williamsom | F28B 1/02 159/2.3 |
| 4,745,943 A * | 5/1988 | Mortensen | B01D 45/04 137/177 |
| 5,537,756 A * | 7/1996 | Haessner | D21F 5/10 165/89 |
| 5,552,578 A * | 9/1996 | Violi | A21B 3/04 126/20 |
| 5,943,788 A * | 8/1999 | Autio | D21F 5/10 165/90 |
| 6,148,844 A * | 11/2000 | Stamatakis | F16T 1/165 137/177 |
| 2014/0076555 A1* | 3/2014 | Kerr | E21B 43/2408 166/272.3 |
| 2016/0042817 A1* | 2/2016 | Reinsch | G21C 15/18 376/283 |
| 2017/0361286 A1* | 12/2017 | Kremer | B01F 5/049 |

* cited by examiner

*Primary Examiner* — Gregory A Wilson
(74) *Attorney, Agent, or Firm* — Elwood L. Haynes

(57) ABSTRACT

A method for removing condensate from a steam line during a cold startup is provided, including introducing a dip tube in a substantially vertical orientation within a substantially vertical section of a steam line, wherein the dip tube includes a proximal end and a distil end, immersing the distil end within a volume of condensate, connecting the proximal end to a removal conduit external to the steam line, and removing at least a portion of the condensate through the removal conduit.

3 Claims, 7 Drawing Sheets

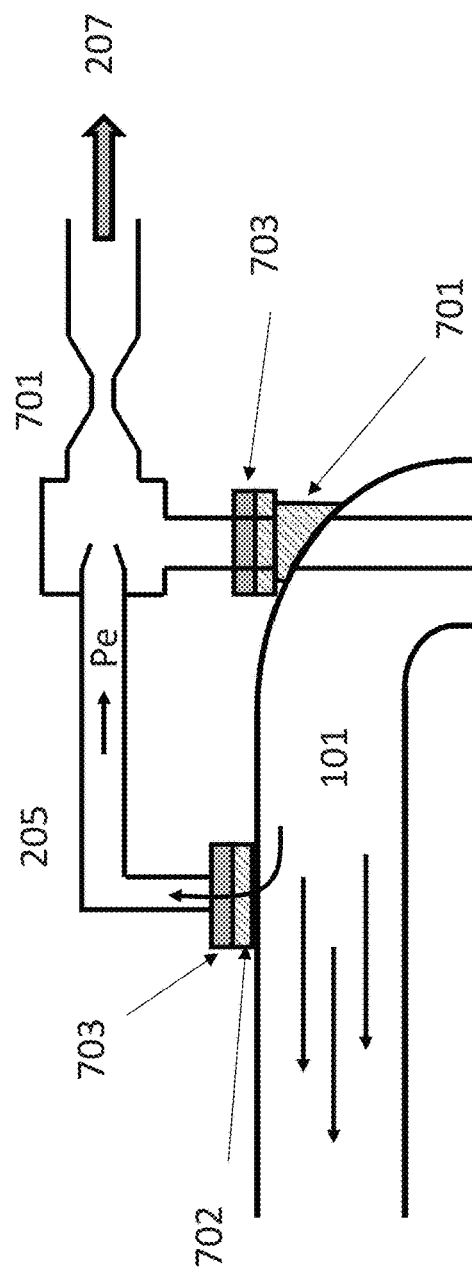
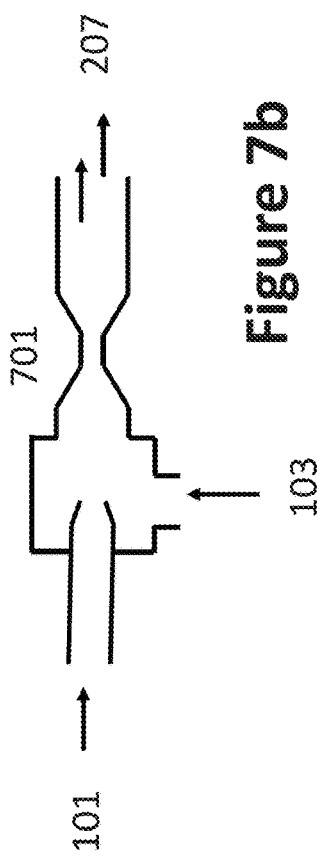
Figure 7
Figure 7a
Figure 7b

METHOD FOR REMOVING LARGE AMOUNTS OF CONDENSATE FROM AN UNDERGROUND VAULT STEAM SYSTEM DURING STARTUP

BACKGROUND

In a steam system, a boiler or steam generating unit is supplied feed water. The feed water is heated to the saturated liquid state, vaporized to the saturated vapor state (steam), and then superheated. The steam produced may be used to transfer heat to a process or a device. The steam typically leaves the boiler via the main steam line and enters the main steam header. From the main header, piping directs the steam to the process or device. As the steam performs its work in manufacturing processes, turbines, building heat, etc., the steam transfers its heat. As the steam releases this heat, it is cooled and reverts back to a liquid phase called condensate.

If condensate backs up in the steam system, inefficiency will occur. Condensate backed up inside of the steam system piping cools the tubes that carry the steam to the process or device. When this sub-cooled condensate is suddenly replaced by hot steam, the expansion and contraction of the tubes stress the tube joints. Constantly repeating this cycle may cause premature system failure. Finally, water hammer may result. Water hammer can occur where an accumulation of condensate is trapped in a portion of horizontal steam piping. The velocity of the steam flowing over the condensate causes ripples in the water. Turbulence builds up until the water forms a solid mass, or slug filling the pipe. This slug of condensate can travel at the speed of the steam and will strike the first elbow in its path with a force comparable to a hammer blow. This force may be strong enough to break the pipe.

To solve these problems, steam traps have been long used in steam piping and in steam operated equipment to prevent the build-up of condensate formed by the condensation of steam in lines from the boiler. The goal of these steam traps is to drain the condensate as well as discharge air and non-condensable gases without permitting the steam to escape. If steam is allowed to escape, heat that should have been transferred to the system will be lost. Steam traps are commonly located after the main steam header throughout the system. Multiple pipes conducting steam to the system may connect to a single manifold which conducts condensate to the steam trap. The condensate passes through the condensate return line and is collected and directed back to the boiler to repeat the water to steam process. Removing the condensate prevents damage to steam lines, steam turbines, steam pistons and other equipment that is operated and/or powered by the energy contained within the steam. Additionally, condensate removal, in some cases, may prevent water damage to any goods being manufactured.

However, if the steam system has been out of operation for an extended period of time, the piping will be much cooler than the entering steam. During the startup phase of a steam system, as the entire piping system is being heated, far more condensate is generated than can typically be removed by a steam trap. This condensate will tend to accumulate at transitions between a long horizontal length of piping and a substantially vertical section. At this elbow, enough condensate may accumulate to effectively block the pipe and cause downstream problems.

Therefore, a need exists within the industry for a system for removing large amounts of condensate from an underground vault steam system during startup.

SUMMARY

A method for removing condensate from a steam line during a cold startup is provided, comprising introducing a dip tube in a substantially vertical orientation within a substantially vertical section of a steam line, wherein the dip tube comprises a proximal end and a distil end, immersing the distil end within a volume of condensate, connecting the proximal end to a removal conduit external to the steam line, and removing at least a portion of the condensate through the removal conduit.

BRIEF DESCRIPTION OF THE FIGURES

FIG. 1a is a schematic representation of the typical steam piping system of FIG. 1, with further detail of the second piping elbow.

FIG. 1b is a schematic representation of the typical steam piping system of FIG. 1, with further detail of the first piping elbow.

FIG. 2a is a schematic representation of the typical steam piping system of FIG. 2, with further detail of the second piping elbow.

FIG. 7 is a schematic representation of a steam piping system illustrating a system for removing condensate illustrating a steam eductor.

FIG. 7a is a schematic representation of the typical steam piping system of FIG. 7, with further detail of the blind flange and eductor permanent flange.

FIG. 7b is a schematic representation of the typical steam piping system of FIG. 7, with further detail of the eductor.

DESCRIPTION OF PREFERRED EMBODIMENTS

Element Numbers

Figure 1:
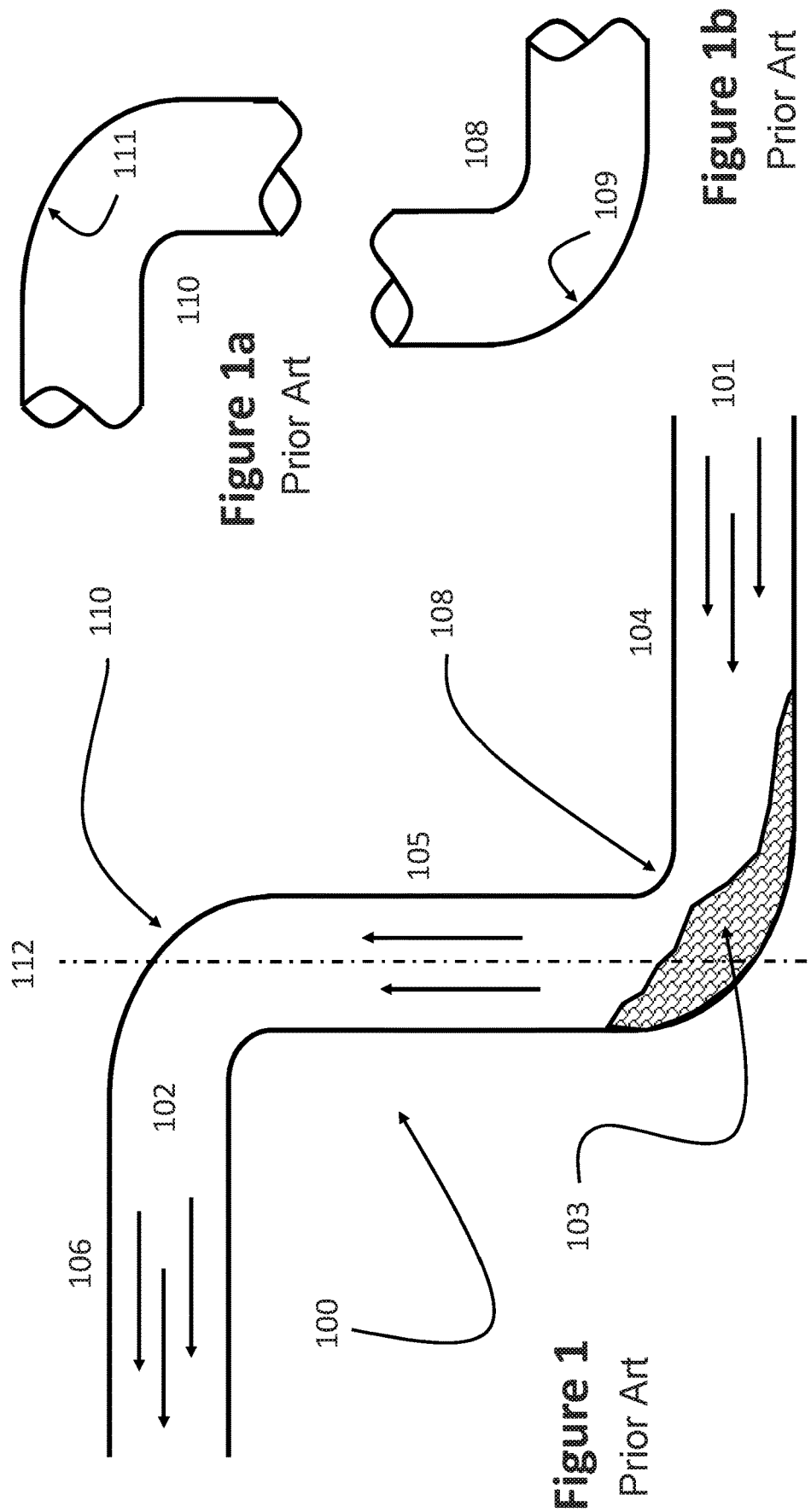
FIG. 1 is a schematic representation of a typical steam piping system.

100=steam piping system
101=steam
102=steam pipeline
103=condensate
104=first substantially horizontal piping section
105=substantially vertical piping section
106=second substantially horizontal piping section
108=first piping elbow
109=major internal radius (of first piping elbow)
110=second piping elbow
111=major external radius (of second piping elbow)
112=centerline of substantially vertical piping section
200=condensate removal system
201=permanent flange 202=blind flange
203=dip tube
204=temporary flange (connected to dip tube)
205=evacuation tube
206=centerline of dip tube
207=condensate extracted from the piping system
401=interior surface (of substantially vertical piping section)
402=first predetermined distance
403=second predetermined distance
404=distil end (of dip tube)
405=third predetermined distance
406=anterior side (of dip tube)
407=posterior side (of dip tube)
601=condensate extraction pump
701=steam eductor
702=steam eductor permanent flange
703=steam eductor temporary flange Turning to FIG. 1, a typical steam piping system 100 is illustrated. In such a system, steam 101 flows through steam pipeline 102. As steam pipeline 102 may be hundreds, or even thousands, of meters in total length, steam 101 will typically be superheated so that single phase steam reaches the various processes and equipment with little or no entrained water. Steam pipeline 102 will typically have substantially horizontal sections 104, 106 and also substantially vertical sections 105. Substantially vertical section 105 has a first centerline 112.

As used herein, the term "substantially vertical" is defined as having an angle between the piping segment centerline and a freely articulating plumb bob line of less than 15 degrees, preferably less than 10 degrees, and more preferably less than 5 degrees.

As used herein, the term "substantially horizontal" is defined as having an angle between the piping segment centerline and a freely articulating spirit level of less than 15 degrees, preferably less than 10 degrees, and more preferably less than 5 degrees.

During startup, the steam 101 flowing through steam pipeline 102 initially may not yet be fully superheated. And, if the system has been non-operational for very long, the steam pipeline 102 may be close to ambient temperature. Either of these conditions can lead to at least a portion of the steam to lose sufficient heat to change phase and become liquid condensate 103. As condensate 103 forms, it will typically be carried along the substantially horizontal section 104 with steam 101, and may not become dislodged from the moving steam until it encounters an obstacle, such as a substantially vertical piping section 105. At such a transition point, the condensate 103 will tend to accumulate. This condensate 103 must be removed from the interior of steam pipeline 102.

As discussed above, condensate pool 103 will tend to accumulate at locations where a first substantially horizontal piping section 104 experiences a first transition into a substantially vertical piping section 105. This first transition will typically comprise a first piping elbow 108, with a major internal radius 109. Such an arrangement will typically then experience a second transition, into a second substantially horizontal piping section 106. This second transition may comprise a piping elbow 110, with a major external radius 111.

Figure 2:
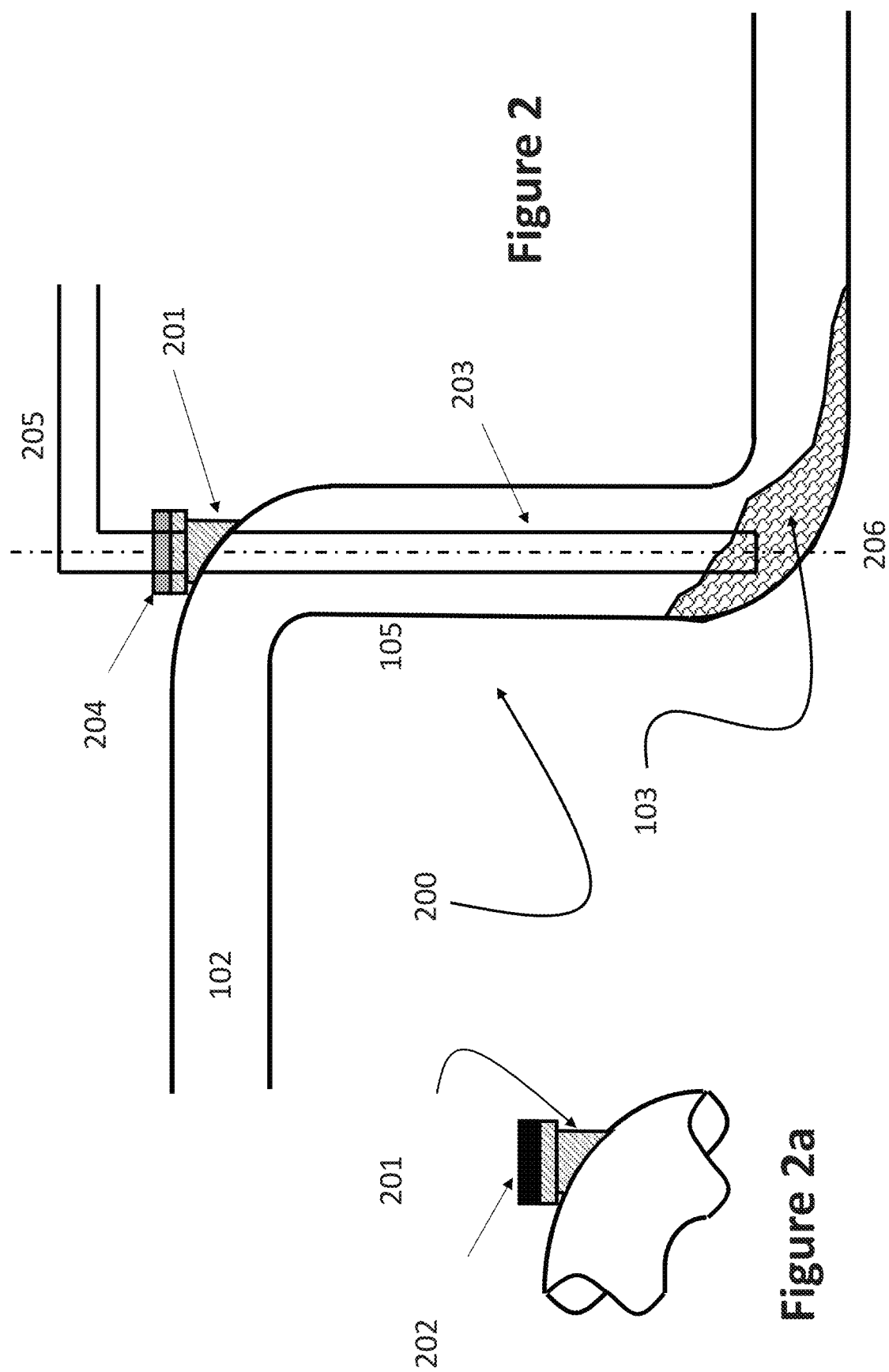
FIG. 2 is a schematic representation of a steam piping system illustrating a system for removing condensate.

Turning to FIG. 2, a system 200 for removing condensate 103 from steam pipeline 102 during a cold startup is illustrated. Permanent flange 201 is attached to substantially vertical piping section 105. During normal operation, i.e. not during startup, permanent flange 201 may be blocked by blind flange 202, as illustrated in FIG. 2a. During startup operation, blind flange 202 is removed, and dip tube 203 is inserted into substantially vertical pipe section 105, through permanent flange 201. Dip tube 203 is connected to temporary flange 204 which is configured to sealably connect to permanent flange 201. Dip tube 203 is fluidically connected to evacuation tube 205. Dip tube 203 has a second centerline 206.

Figure 3:
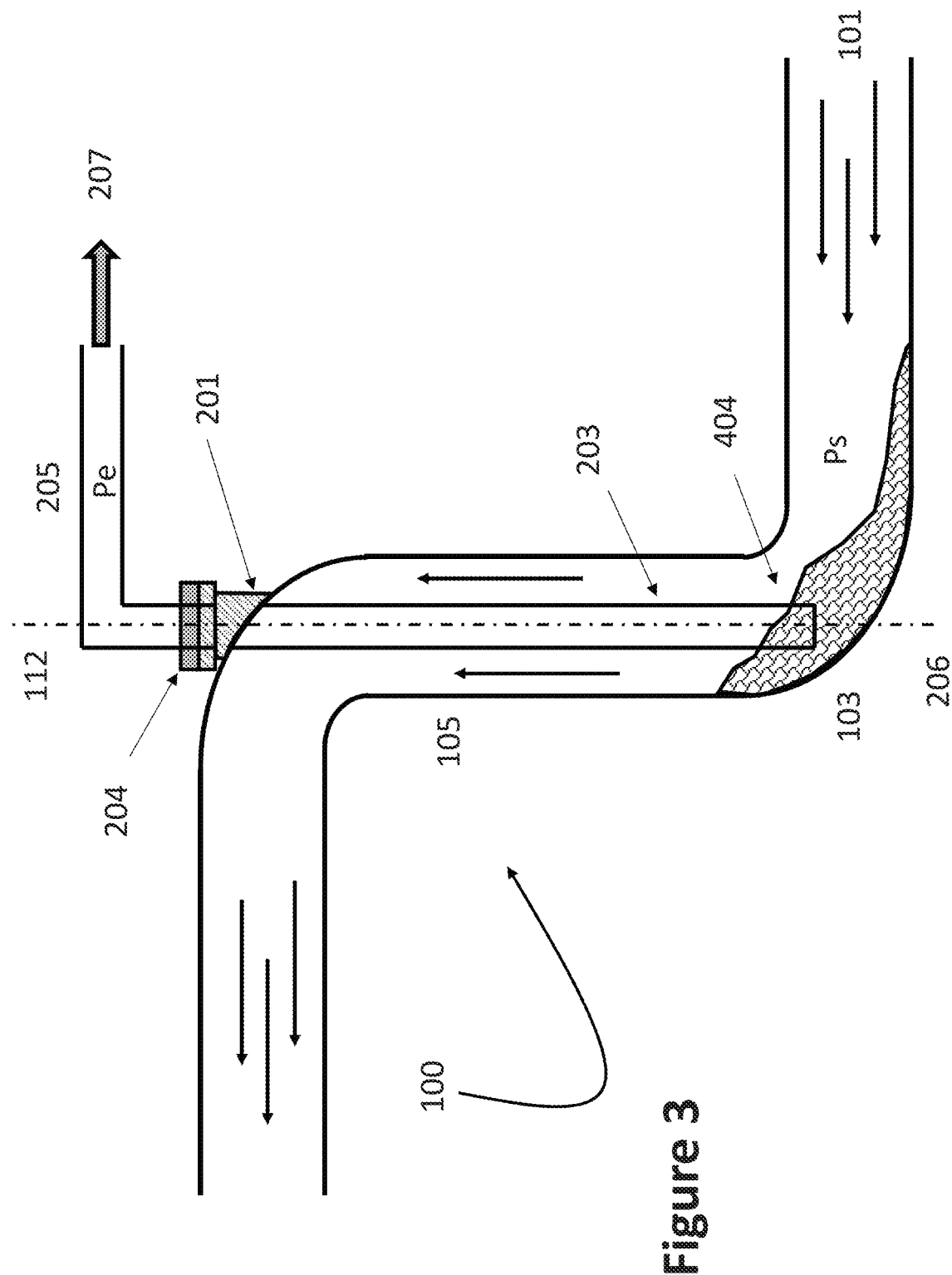
FIG. 3 is a schematic representation of a steam piping system illustrating a system for removing condensate.

As illustrated in FIG. 3, during operation, dip tube 203 is inserted into substantially vertical piping section 105. Dip tube 203 is sealingly attached to piping system 100 by way of temporary flange 204 being securely attached to permanent flange 201. Steam 101 within piping system 100 will be at an elevated pressure Ps. Evacuation tube 205 will be at a pressure Pe, that is lower than Ps, thereby encouraging any fluid that is present at distil end 404 to flow through dip tube 203, out of piping system 100, through evacuation tube 205 and then out of the system as extracted condensate 207. Once piping system 100 has reached the desired operating temperature and no further condensation will form, dip tube 203 can be removed and blind flange 202 be returned to permanent flange 201.

Figure 4A:
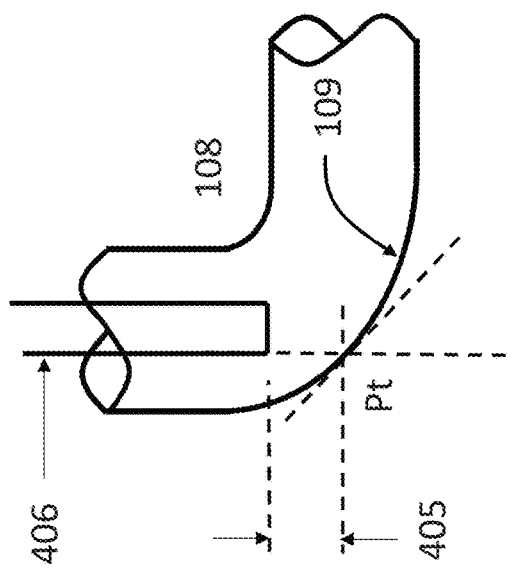
FIG. 4a is a schematic representation of the typical steam piping system of FIG. 4, with further detail of the first piping elbow.
Figure 4:
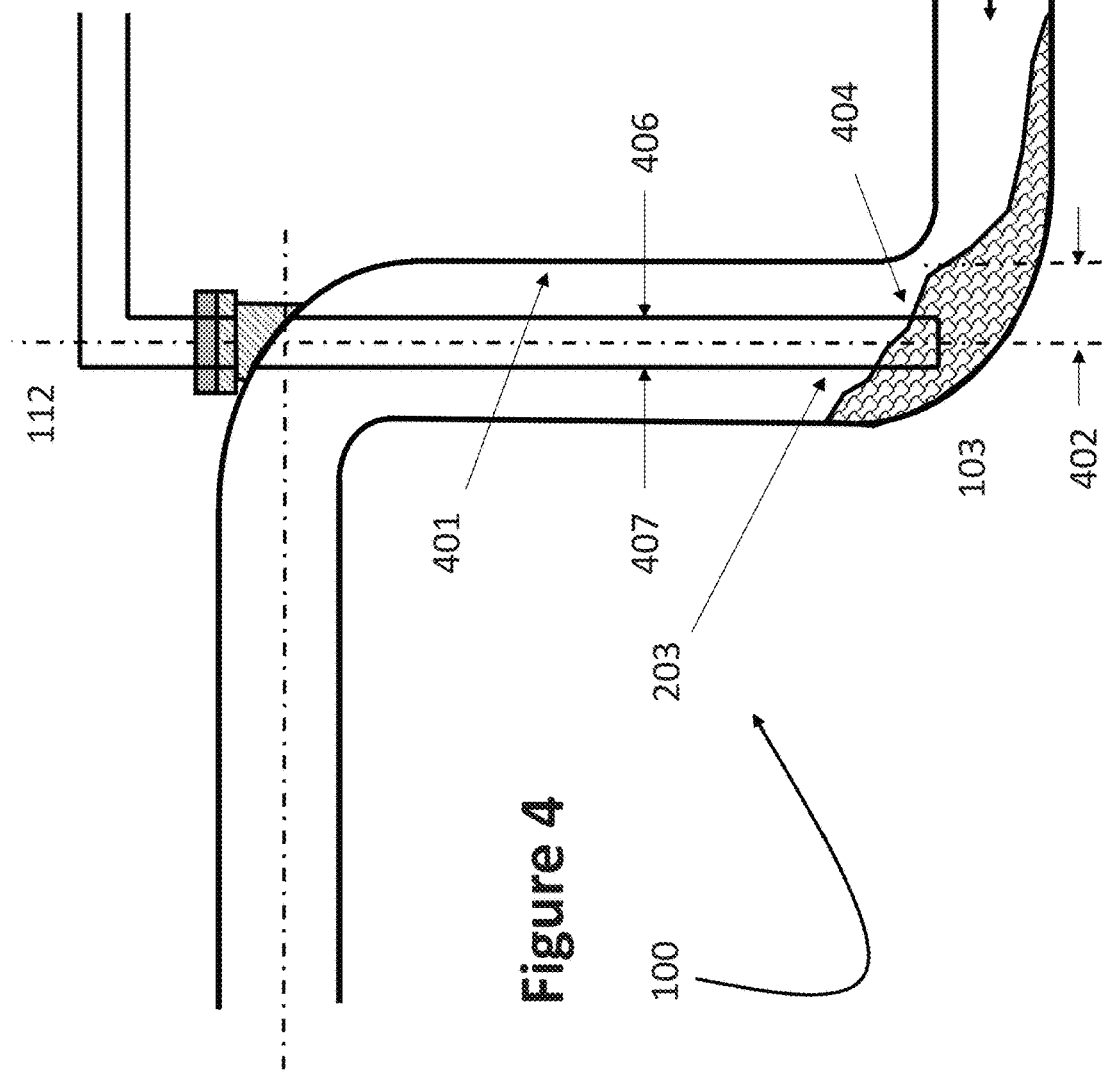
FIG. 4 is a schematic representation of a steam piping system illustrating a system for removing condensate.
Figure 5:
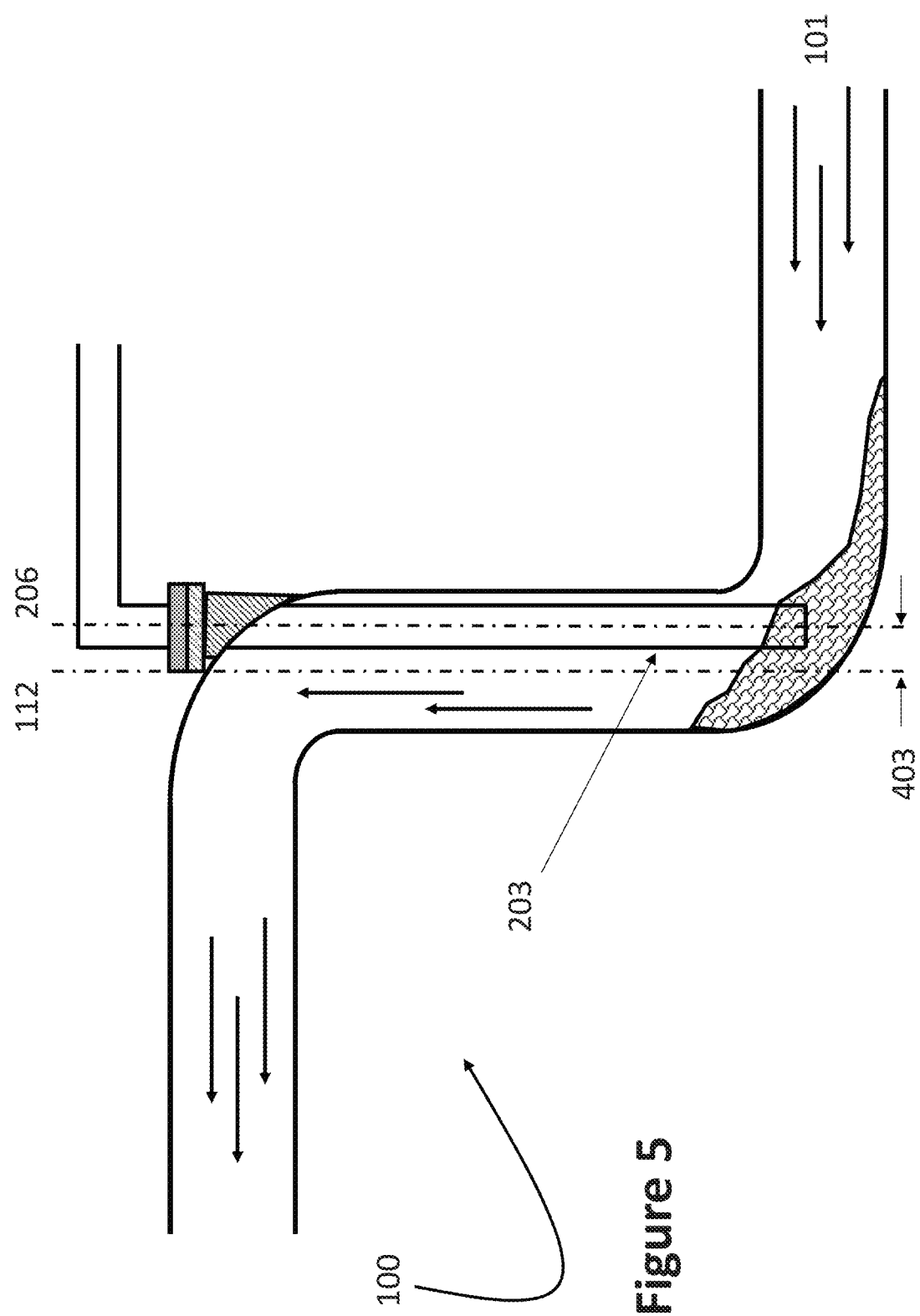
FIG. 5 is a schematic representation of a steam piping system illustrating a system for removing condensate.

Turning to FIG. 4, substantially vertical piping section 105 comprises an interior surface 401. A first predetermined distance 402, may be specified in order to locate dip tube 203 at a location within substantially vertical piping section 105, other than concentrically. First predetermined distance 402 is determined relative to interior surface 401. As illustrated in FIG. 5, second predetermined distance 403 may be determined relative to the distance between the centerline 112 of substantially vertical piping section 105 and centerline 206 of dip tube 203.

First predetermined distance 402 or second predetermined distance 403 may be greater than 2 inches. And, depending on the internal diameter of substantially vertical piping section 105, may be greater than 5 inches. First predetermined distance 402 may be less than (or equal to) ¼ of the internal diameter of substantially vertical piping section 105. Second predetermined distance 403 may be greater than (or equal to) ¼ of the internal diameter of substantially vertical piping section 105.

Returning to FIG. 4, dip tube 203 comprises distil end 404. This is then end that will be submerged into condensate 103. Dip tube 203 comprises an anterior side 406 and a posterior side 407, relative to the direction that steam 101 is flowing through piping system 100. As illustrated in FIG. 4, steam 101 is flowing from right to left, thus the steam first encounters the rightmost side of dip tube 203. This is designated the anterior side 406. Posterior side 407 is diametrically on the opposite side of dip tube 203.

Presuming that the distil end 404 of dip tube 203 is fashioned as being approximately 90 degrees from the sides of dip tube 203 (i.e. "cut flat"), then posterior side 407 is also defined as the side of the distill end 404 that is closest to major internal radius 109. As illustrated in FIG. 4a, if posterior side 407 were to be extended until it were to actually contact major interior radius 109, this theoretical point of contact is designated Pt for piping tangent. In order to better ensure this submergence, a third predetermined distance 405 may be specified relative to Pt. Third predetermined distance 405 may be greater than 2 inches, but preferably is less than (or equal to) 2 inches.

Figure 6:
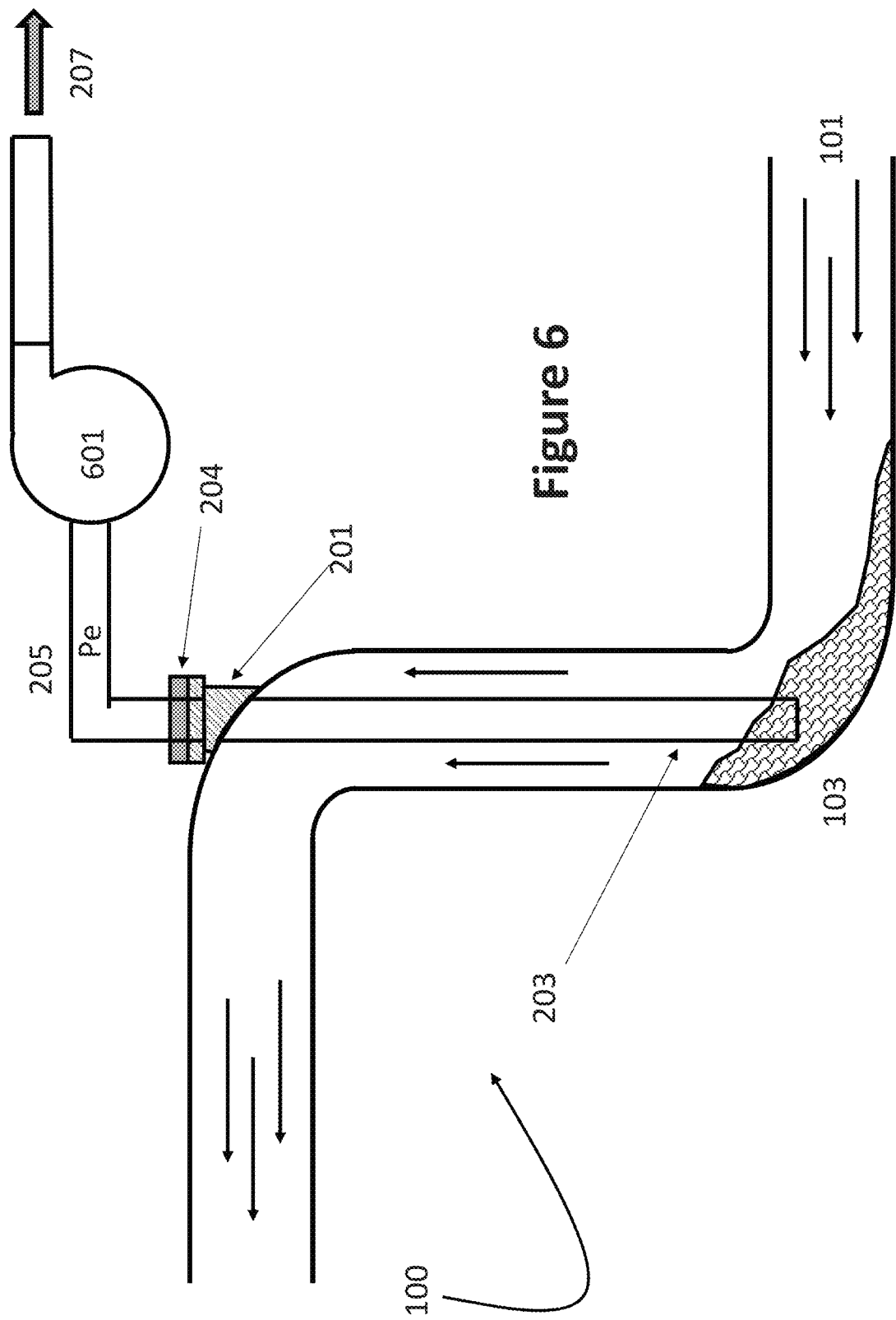
FIG. 6 is a schematic representation of a steam piping system illustrating a system for removing condensate illustrating a condensate extraction pump.

As indicated in FIG. 6, extraction pump 601 may be included in evacuation tube 205 in order to provide the lower pressure Pe, if required, to remove condensate 103 from piping system 100 as extracted condensate 207.

As indicated in FIGS. 7 and 7a, steam eductor 701 may be included in evacuation tube 205 in order to provide the lower pressure, Pe, if required, to remove condensate 103 from piping system 100. In this system, a second permanent flange, permanent eductor flange 702, is located in steam piping system 100. The location of permanent eductor flange 702 is indicated being downstream of permanent flange 201, but may be located anywhere in the piping system. During normal operation, i.e. not during startup, permanent flange 701 may be blocked by blind flange 202, as illustrated in FIG. 2a. During startup operation, blind flange 202 is removed and temporary eductor flange 703 is attached to permanent eductor flange 702. A portion of steam 101 will enter eductor 701 as motive steam 704. This will create a low pressure zone in the eductor which will draw condensate 103 up through dip tube 203 and out evacuation tube 205.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for removing condensate from a steam line during a cold startup, comprising:
    introducing a dip tube in a substantially vertical orientation within a substantially vertical section of a steam line during a cold startup of the steam line, wherein the dip tube comprises a proximal end and a distil end,
    immersing the distil end within a volume of condensate located within the steam line, wherein the steam line is at a first pressure,
    connecting the proximal end to a removal conduit external to the steam line, wherein the removal conduit is at a second pressure, and wherein the first pressure is greater than the second pressure, and
removing at least a portion of the condensate through the removal conduit due to the pressure difference between the first pressure and the second pressure, wherein:
    the substantially vertical section of a steam line comprises a first centerline,
    the dip tube comprises a second centerline, and
    the first centerline and the second centerline are separated by a first predetermined distance.

2. A method for removing condensate from a steam line during a cold startup, comprising:
    introducing a dip tube in a substantially vertical orientation within a substantially vertical section of a steam line during a cold startup of the steam line, wherein the dip tube comprises a proximal end and a distil end,
    immersing the distil end within a volume of condensate located within the steam line, wherein the steam line is at a first pressure,
    connecting the proximal end to a removal conduit external to the steam line, wherein the removal conduit is at a second pressure, and wherein the first pressure is greater than the second pressure, and
removing at least a portion of the condensate through the removal conduit due to the pressure difference between the first pressure and the second pressure, wherein:
    the substantially vertical section of a steam line comprises an anterior interior surface,
    the dip tube comprises a second centerline, and
    the second centerline and the anterior interior surface are separated by a second predetermined distance.

3. A method for removing condensate from a steam line during a cold startup, comprising:
    introducing a dip tube in a substantially vertical orientation within a substantially vertical section of a steam line during a cold startup of the steam line, wherein the dip tube comprises a proximal end and a distil end,
    immersing the distil end within a volume of condensate located within the steam line, wherein the steam line is at a first pressure,
    connecting the proximal end to a removal conduit external to the steam line, wherein the removal conduit is at a second pressure, and wherein the first pressure is greater than the second pressure, and
removing at least a portion of the condensate through the removal conduit due to the pressure difference between the first pressure and the second pressure, further comprising:
    a substantially horizontal section of the steam line upstream of the substantially vertical section of the steam line,
    a first piping elbow located between the substantially horizontal section and the substantially vertical section, wherein:
    the first piping elbow comprises a major interior radius,
    the dip tube comprises posterior side and a distil end,
    a line extending from the dip tube posterior side and the intersecting with the major interior radius comprises a piping tangent, and
    the distil end of the dip tube and the piping tangent are separated by a third predetermined distance.

* * * * *